United States Patent Office 2,925,320
Patented Feb. 16, 1960

2,925,320

COMPOUNDS OF THE CLASS $P_2X_5NO$ AND PROCESS FOR PRODUCING SAME

Ernest Jack Kahler, Columbus, Ohio, assignor, by mesne assignments, to Pennsalt Chemicals Corporation, a corporation of Pennsylvania No Drawing. Application February 16, 1956
Serial No. 565,794

16 Claims. (Cl. 23—14)

This invention relates to new compounds having the general empirical formula $P_2X_5NO$, wherein X is a halogen, and to the process for producing said compounds.

The new and novel compounds prepared by the practice of this invention have the empirical formula $P_2X_5NO$, wherein X may be any of the halogens: chlorine, bromine, iodine or fluorine. The spectroscopic analysis of the compounds, the nature of the process of preparing them, and the possible mechanisms by which the process may proceed, suggest three possible structures, illustrated in Formulas I, II, and III below. As more fully explained, the structure illustrated in Formula I is believed to be the most accurate of the three possible structures. For the purpose of specific illustration, X is shown as chlorine in the following structures:

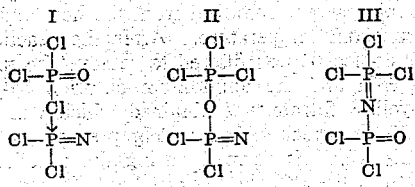

Of the three structures, the structure of Formula II with the oxygen bridge between the two phosphorus atoms is the least probable in view of the Raman spectrum of $P_2Cl_5NO$. In order to correlate this structure with the Raman spectrum, it would be necessary to accept the rather improbable assumption that the P=N frequency is coincidentally the same as the P=O oscillation in phosphoroxychloride. In addition, it would be expected that P—O—P oscillations would appear in the spectrum. The P—O—P oscillations ordinarily appear in the range of 663–1226 cm.$^{-1}$ as shown clearly in the spectrum of dichlorophosphoric acid and the spectrum of several polyphosphates. No lines appear in this region in the spectrum of $P_2Cl_5NO$ which could be definitely correlated with a P—O—P bond.

The existence of a chlorine bridge, as in the structure of Formula I, believed to be correct, should result in a slight increase of all other frequencies of the $OPCl_2$—Cl part of the molecule, and this is observable in the Raman spectrum, although the increase is within the limit of error. A P=N oscillation, necessary for the structures of Formula I, could be correlated with a frequency of 1226 cm.$^{-1}$. Only a slight increase of intensity of the P=O frequency line could be observed, suggestive of a strong polarity of the bond. The correlation of the spectrum with the chlorine bond, as in Formula I, requires the assumption that the oscillation of the groups $OPCl_2$—Cl— and the group $NPCl_2$—Cl— are identical since the oscillations 194 cm.$^{-1}$, 271 cm.$^{-1}$, 339 cm.$^{-1}$, and 487 cm.$^{-1}$ must be related to both of these groups.

A similar hypothesis is also necessary for the structure of Formula III. A splitting could exist only at 580–594 cm.$^{-1}$ and 1226(P=N)—1297(P=O) cm.$^{-1}$. On this basis, all of the lines observed would be explained, except for very weak lines at 533 cm.$^{-1}$, 663 cm.$^{-1}$, and 1256 cm.$^{-1}$. Lower oscillations at 500 and 600 cm.$^{-1}$ may also be expected, but the 1256 cm.$^{-1}$ bond is difficult to explain in terms of the structure of Formula III. Accordingly, the Raman spectrum corresponds best with the structure of Formula I. Although mechanisms for the formation of $P_2X_5NO$ can be proposed to explain all three possible structures, the mechanism resulting in the structure of Formula I, as shown below, is believed to be the most probable reaction. The mechanisms are set forth hereinafter, following the detailed description of the process.

The compounds of the class $P_2X_5NO$ are prepared by the reaction of a phosphorus pentahalide with either hydroxylamine or a mineral acid salt of hydroxylamine. The reaction may be advantageously carried out in the presence of an inert, organic solvent. There are numerous solvents which may be used, including aromatic hydrocarbons such as benzene and halogenated hydrocarbon solvents, for example sym-tetrachloroethane. Organic compounds containing an active hydrogen, such as alcohols, aldehydes, ketones, olefins, and esters, would not be satisfactory because of their reactivity toward the phosphorus pentahalide and the products of the reaction. The solvent may be chosen so as to facilitate the separation of the reactants and by-products from the desired $P_2X_5NO$. Thus, ordinarily, halogenated hydrocarbon solvents are preferred because they readily dissolve the phosphorus pentahalide reactant at reaction temperatures but exhibit substantially no solvent action towards the hydroxylamine mineral acid salt reactant at elevated temperatures and substantially no solvent action towards ammonium chloride, one of the by-products of the reaction. Another desired property of the solvent is that it has a boiling point preferably not higher than 180° C. at atmospheric pressure. The use of solvents having a maximum boiling point of the order of about 180° C. at atmospheric pressure advantageously permits ready separation of the product from the solvent and other by-products, such as by distillation techniques. Many solvents may be used as the medium for carrying out the reaction, some of which are more advantageous in some respects than in others. The choice of solvents is well within the skill of the art to those with an understanding of the nature of the reactants, the by-products of the reaction, and the compound to be separated. The phosphorus pentahalides used in this reaction, of course, are those compounds having the empirical formula $PX_5$ wherein X may be any halogen, chlorine, bromine, iodine, or fluorine, or any combination thereof. Due to the volatile nature of the hydroxylamine, the hydroxylamine may be introduced into the reaction mixture by passing the hydroxylamine as a gas through the reaction mixture. Preferably, however, the mineral acid salts of hydroxylamine are used instead of hydroxylamine. The mineral acid salts of hydroxylamine are not volatile and, therefore, may be more easily handled in the reaction than the hydroxylamine. In all probability, hydroxylamine, if used, is quickly converted to the hydrogen halide salt of hydroxylamine, since hydrogen halide is one of the by-products of the reaction. Accordingly, for the purposes of this application, the hydroxylamine is considered the equivalent of the hydrogen halide salts of the mineral acid salts of hydroxylamine.

The compound $P_2Cl_5NO$ is representative of the class of compounds $P_2X_5NO$, wherein X is halogen and, for purposes of illustration, the process and product are described in more detail with respect to this compound. The halogen of the phosphorus pentahalide starting material, of course, is the halogen desired in the final reaction product. Therefore, in the production of $P_2Cl_5NO$, phosphorus pentachloride is reacted with a mineral acid salt of hydroxylamine in an appropriate inert solvent, in this case, sym-tetrachloroethane. The hydrogen halide salts of hydroxylamine are preferred because the volatile nature of the hydrogen halide permits easy separation of the hydrogen halide from the reaction mixture. Other mineral acid salts of hydroxylamine may be used, such as hydroxylamine hydrosulfate, but this compound has the disadvantage of requiring additional steps to remove the nonvolatile sulfuric acid from the reaction mixture.

The reaction between $PCl_5$ with $HONH_2 \cdot HCl$ begins at a temperature of from about 35 to 40° C., as indicated by the liberation of chlorine and hydrogen chloride. The reaction is continued until the chlorine gas is no longer evolved. The cessation of the liberation of chlorine, as indicated visually or by appropriate chemical tests of the off gases, is the point of highest yield. Continued reaction beyond the point of cessation of the liberation of chlorine reduces the yield. The reaction, of course, may be stopped short of the liberation of the chlorine gas, but this also merely decreases the yield obtainable. When the point at which the liberation of chlorine ceases, the reaction mixture is cooled rapidly to room temperature. A white solid separates out as insoluble in the sym-tetrachloroethane solvent. This solid may be removed from the reaction mixture by filtration. The white solid removed contains any unreacted hydroxylamine hydrochloride and a by-product of the reaction, ammonium chloride. The filtrate contains the $P_2Cl_5NO$ and, in addition, $POCl_3$, which is also a by-product of the reaction in the sym-tetrachloroethane. The $POCl_3$ may be separated from the filtrate by distillation by reason of its having a lower boiling point than the $P_2Cl_5NO$. The sym-tetrachloroethane, having a boiling point of about 146° C., also can be separated from the $P_2Cl_5NO$ by means of distillation. In the instances where the solvent used has a boiling point different from the boiling point of the $POCl_3$ by-product, it is possible to separately recover the $POCl_3$ from the solvent by means of fractional distillation. Preferably, the $POCl_3$ and the solvent are separated from the $P_2Cl_5NO$ by means of distillation under reduced pressure. The liquid residue remaining after the distillation of the $POCl_3$ and the sym-tetrachloroethane is the desired product which may be contaminated by other high-boiling, unidentified constituents. The product $P_2Cl_5NO$ may be purified by distilling, for example, at between 95–105° C. under 1 mm. Hg pressure or other equivalent temperatures and pressures. The material recovered in the distillate under these conditions is purified $P_2Cl_5NO$, there remaining behind in the residue an unidentified, high-boiling fraction. The $P_2Cl_5NO$ should not be distilled from the reaction mixture at atmospheric pressure for the reason that at such elevated temperatures the product rapidly undergoes decomposition.

In the practice of this invention, various proportions of the phosphorus pentahalide and the hydroxylamine salt may be used, the reaction preferably being conducted with about 0.5 to 2.0 moles of the hydroxylamine salt for every mole of phosphorus pentahalide. The reaction may be carried out at temperatures ranging from about 40° C. to about 120° C. The time for the reaction to run to completion, as indicated by the cessation of the liberation of the halogen gas may be from about 24 hours at a temperature of about 40–50° C. to about 30 minutes at higher temperatures of 100–120° C. As indicated previously, for optimum yield, the reaction is permitted to run until the liberation of the halogen ceases, at which time the reaction mixture is stopped by cooling to about room temperature. In general, the operating conditions of time and temperature for optimum yield are temperatures in the range of from about 70–110° C. with the reactants present in the ratio of about 1 mole of the phosphorus pentahalide to 0.90–1.05 moles of the hydroxylamine salt. At temperatures of less than 70° C., the reaction time is unnecessarily long and the yield of the product is lowered. At temperatures greater than about 110 to 120° C., the reaction runs very rapidly and it is difficult to control and stop at the required time for optimum yield. The highest yield of reaction product is had at the moment when all of the phosphorus pentahalide is reacted. This moment coincides with the cessation of the liberation of the halogen.

The following example of the practice of this invention is illustrative of a set of preferred operating conditions to obtain optimum yield of the product.

*Example*

Into a reaction vessel were placed 312.5 grams (1.50 moles) of $PCl_5$, 109.5 grams (1.575 moles) of $HONH_2 \cdot HCl$ and 750 milliliters of sym-tetrachloroethane. The mixture was agitated by stirring, and heat was applied to rapidly raise the temperature of the reaction mixture. Gas composed of HCl and $Cl_2$ began to evolve at about 35° C. The rate of the gas evolution increased as the temperature of the reaction mixture increases. The temperature of the reaction mixture quickly rose to about 95–100° C. and was maintained at that temperature until the chlorine gas no longer evolved. Under these conditions, approximately 60 minutes elapsed between the commencement of the evolution of the chlorine gas and the cessation of the liberation of chlorine. While the chlorine gas evolved the reaction mixture was colored a bright yellow. After the chlorine ceased to evolve, the color of the reaction mixture tended toward a white color. The change in color of the reaction mixture is a visual indication of when the reaction should be stopped. When this took place, the reaction mixture was removed from the heat and rapidly cooled to room temperature. After the reaction mixture was cooled, it was filtered to remove the unreacted $HONH_2 \cdot HCl$ and the ammonium chloride by-product. A light-yellow filtrate was obtained which was distilled at 45–65° C. under 100 mm. Hg pressure to remove the $POCl_3$ which is formed during the reaction. The pressure was then further reduced to 10 mm. Hg and the temperature was then maintained in the range of 25–50° C. to remove the solvent. For purification purposes, the residue remaining after the solvent removal was further distilled at 1 mm. Hg pressure and the fraction boiling between 85–105° C. was collected as product, yielding about 94.5 grams of $P_2Cl_5NO$ as a colorless liquid.

The following physical properties have been determined for $P_2Cl_5NO$:

*Boiling point at designated pressures*

| Boiling Point, ° C. | Pressure, mm. |
|---|---|
| 55 | 0.1 |
| 92 | 1.0 |
| 138 | 10.0 |
| 198 | 100.0 |
| 270–280 [1] | 760.0 |

[1] The boiling point at 760.0 mm. is expressed in a range of temperatures because at this elevated temperature the reaction product undergoes rapid decomposition.

The freezing point of the $P_2Cl_5NO$ is 34.1° C. The density at 38° C./4° C. is 1.796. The refractive index ($n_D^{38}$) is 1.5260. The molecular refractivity ($M_D^{38}$) is 46.02. The $P_2Cl_5NO$ is soluble in aromatic hydrocarbons, aliphatic hydrocarbons, chlorinated hydrocarbons, and ethers. It reacts exothermically with alcohols and water, liberating hydrochloric acid and heat.

A series of runs, summarized in the following tabulation, illustrate the effect of reaction temperature and reaction time on the yield of $P_2Cl_5NO$ obtained by reacting $PCl_5$ with $HONH_2 \cdot HCl$.

Reaction times and temperatures

| Run No. | Size, Moles | Time, Minutes | Maximum Temp., °C. | Conversion [1] percent |
|---|---|---|---|---|
| 1 | 0.5 | 50 | 133 | 11 |
| 2 | 0.5 | 26 | 125 | 47 |
| 3 | 0.5 | 15 | 109 | 39 |
| 4 | 1.0 | 23 | 112 | 47 |
| 5 | 1.5 | 30 | 115 | 47 |

[1] Based on amount of PCl₅.

The same ratio of $HONH_2 \cdot HCl$ (1.05 moles) to PCl (1.00 mole) was used in all of the runs. The time of the reaction covers the period during which the reaction mixture is first heated until the reaction is stopped by cooling. Run 1 was continued until $Cl_2$ was no longer detectable in the evolved gases. The low amount of product obtained, as indicated by the percent conversion, was apparently due to too long a reaction time, the product apparently having been lost by reaction with other components of the reaction mixture. In runs 2, 4, and 5 the reaction was stopped at the point where the reaction mixture lost its yellow color (evidencing cessation of the liberation of chlorine). Run 3 was stopped immediately after a large surge of gases evolved from the reaction mixture. Following stripping of the solvent from the reaction mixture of run 3, unreacted $PCl_5$ was obtained, indicating an incomplete reaction.

In general, at least two mechanisms have been proposed for the formation of $P_2X_5NO$ by this process. It is to be understood that these mechanisms are presented only for the purpose of affording a possible explanation of the reactions involved. The first series of possible reactions set forth below have been proposed in explanation of the structures of Formulas I and II, above. For the sake of brevity in the following first series of reactions, the structures of Formulas I and II are designated by the formula $PNCl_2 \cdot POCl_3$. The stepwise reactions for the formation of $PNCl_2 \cdot POCl_3$ which have been proposed are as follows:

(1) $0.66\ PCl_5 + 0.66\ HOH_2N \cdot HCl$
$\rightarrow 0.66\ POCl_3 + 0.66\ NH_4Cl + 0.66\ Cl_2$ (2) $0.33\ PCl_5 + 0.33\ NH_4Cl \rightarrow 0.33\ PNCl_2 + 1.32\ HCl$ (3) $0.33\ PNCl_2 + 0.33\ POCl_3 \rightarrow 0.33\ PNCl_2 \cdot POCl_3$ The sum of the stepwise Reactions 1, 2, and 3, expressed as a total reaction, would be:

(4) $PCl_5 + 0.66\ HOH_2N \cdot HCl \rightarrow 0.33\ PNCl_2 \cdot POCl_3$
$+ 0.66\ Cl_2 + 0.33\ POCl_3 + 0.33\ NH_4Cl + 1.32\ HCl$ The following series of possible reactions have been proposed in explanation of the structure of Formula III, above. The structure of Formula III may be designated $Cl_2P(O)-N=PCl_3$. The reactions for the formation of $Cl_2P(O)-N=PCl_3$ which have been proposed are as follows:

(a) $PCl_5 + HONH_2 \cdot HCl \rightarrow Cl_4PO-NH_2 \cdot HCl + HCl$ (b) $Cl_4PO-NH_2 \cdot HCl \rightarrow Cl_2P(O)-NH_2 \cdot HCl + Cl_2$ (c) $Cl_2P(O)-NH_2 \cdot HCl + PCl_5$
$\rightarrow Cl_2P(O)-N=PCl_3 + 3HCl$ or (b') $Cl_4PO-NH_2 \cdot HCl$ [from Reaction
$a] + PCl_5 \rightarrow Cl_4PO-N=PCl_3 + 2HCl$ (c') $Cl_4PO-N=PCl_3 \rightarrow Cl_2P(O)-N=PCl_3 + Cl_2$ The formation of the by-products $POCl_3$ and $NH_4Cl$ can be explained by the reaction:

(d) $PCl_5 + HOHNH_2 \cdot HCl \rightarrow POCl_3 + NH_4Cl + Cl_2$

This invention represents, so far as is known, the first instance of the reaction of phosphorus pentahalide with a mineral acid salt of hydroxylamine to produce chemical compounds having the empirical formula of $P_2X_5NO$ wherein X is a halogen, which reaction also yields $POCl_3$ as a by-product thereof. The reaction with the evolution of chlorine from the reaction in the formation of these compounds is a surprising result and one which could not have been predicted by one skilled in the art.

The compounds of the class represented by the empirical formula $P_2X_5NO$ wherein X is a halogen are useful in the preparation of organic phosphorus compounds used as insecticides, flame retardants for textiles, lubricating oil additives, corrosion inhibitors, and plasticizers for plastic sheet and film. For example, the alkyl ester derivatives of $P_2X_5NO$, wherein the halogens X are replaced by the alkoxy groups, such as $(-OCH_3)$ or $(-OC_2H_5)$, are useful as insecticides.

While the particular embodiments of this invention have been shown and described, it will be obvious to those skilled in the art that various changes and modifications may be made without departing from the invention in its broader aspects and, therefore, the appended claims are intended to cover all such changes and modifications as fall within the true spirit and scope of the invention.

What is claimed is:

1. A compound of the formula: $P_2X_5NO$, wherein X is a halogen.

2. A compound of the formula: $P_2Cl_5NO$, characterized by having a boiling point of about 55° C. at a reduced pressure of about 0.1 mm. of Hg, and a freezing point of between 32–34° C., said compound being soluble in aromatic hydrocarbons, aliphatic hydrocarbons, chlorinated solvents, and ethers.

3. A process for the production of $P_2X_5NO$ wherein X is a halogen comprising reacting a phosphorus pentahalide at a temperature ranging from about 35° C. to about 120° C. in a molar ratio ranging from about 1:0.5 to 1:2 with a compound supplying nitrogen and oxygen atoms selected from the group consisting of hydrolylamine, hydroxylamine hydrogen halide and hydroxylamine hydrosulfate to obtain a reaction mixture containing $P_2X_5NO$ and separating the $P_2X_5NO$ from said reaction mixture.

4. A process for the production of $P_2X_5NO$, wherein X is a halogen, comprising contacting phosphorus pentahalide in a molar ratio ranging from about 1:0.5 to 1:2 with a compound supplying nitrogen and oxygen atoms selected from the group consisting of hydroxylamine, hydroxylamine hydrogen halide and hydroxylamine hydrosulfate at a temperature above room temperature at which liberation of halogen occurs, cooling the reaction mixture at the point at which the liberation of halogen gas ceases, to obtain a reaction mixture containing $P_2X_5NO$, and separating the $P_2X_5NO$ from said reaction mixture.

5. The process of claim 4 wherein the phosphorus pentahalide is $PCl_5$ to yield $P_2Cl_5NO$.

6. The process for the production of $P_2X_5NO$ comprising reacting a phosphorus pentahalide in a molar ratio ranging from about 1:0.5 to 1:2 with a compound supplying nitrogen and oxygen atoms selected from the group consisting of hydroxylamine, hydroxylamine hydrogen halide and hydroxylamine hydrosulfate at a temperature ranging from about 70–110° C. whereby the liberation of halogen occurs, reducing the temperature of the reaction mixture to about room temperature and below to obtain a reaction mixture containing $P_2X_5NO$ and separating $P_2X_5NO$ from said reaction mixture.

7. The process of claim 6 wherein the phosphorus pentahalide is $PCl_5$ to obtain $P_2Cl_5NO$.

8. The process for the production of $P_2X_5NO$, wherein X is a halogen, comprising reacting a phosphorus pentahalide in a molar ratio ranging from about 1:0.5 to 1:2 with a hydroxylamine compound selected from the group consisting of hydroxylamine, hydroxylamine hydrogen halide and hydroxylamine hydrosulfate in the presence of an inert solvent which is a solvent for both the phosphorus pentahalide and $P_2X_5NO$ at reaction temperatures and in which said hydroxylamine compound is substantially insoluble, said inert solvent having a boiling point not greater than about 180° C., conducting the reaction between the phosphorus pentahalide and said hydroxylamine compound at a temperature from above room temperature and below, to obtain a reaction mixture having an insoluble residue of any unreacted hydroxylamine compound, separating said insoluble residue from the reaction mixture, distilling said reaction mixture under reduced pressure to separate therefrom a distillate of $POX_3$ and the solvent, and removing the $P_2X_5NO$.

9. The process of claim 8 wherein the phosphorus pentahalide is $PCl_5$ and there is obtained $POCl_3$ and $P_2Cl_5NO$ in the resulting reaction mixture.

10. The process of claim 8 wherein the solvent is sym-tetrachloroethane.

11. A process for the production of $POX_3$ comprising reacting a phosphorus pentahalide in a molar ratio ranging from about 1:0.5 to 1:2 with a compound supplying nitrogen and oxygen atoms selected from the group consisting of hydroxylamine, hydroxylamine hydrogen halide and hydroxylamine hydrosulfate to yield a reaction mixture containing $POX_3$ and separating said $POX_3$ therefrom.

12. A process for the production of $POCl_3$ comprising reacting phosphorus pentachloride at a temperature ranging from about 35° C. to about 120° C. in a molar ratio ranging from about 1:0.5 to 1:2 with a compound supplying nitrogen and oxygen atoms selected from the group consisting of hydroxylamine, hydroxylamine hydrogen halide and hydroxylamine hydrosulfate in an inert solvent wherein said $POCl_3$ and said phosphorus pentachloride are soluble and said compound supplying nitrogen and oxygen atoms is substantially insoluble at room temperature, during which reaction chlorine is liberated, filtering the reaction mixture and distilling the resultant filtrate to recover $POCl_3$ therefrom.

13. The process of claim 12 wherein said compound supplying nitrogen and oxygen atoms is hydroxylamine hydrogen chloride.

14. The process of claim 3 wherein said compound supplying nitrogen and oxygen atoms is hydroxylamine.

15. The process of claim 3 wherein X is chlorine.

16. The process of claim 15 wherein the compound supplying nitrogen and oxygen atoms is hydroxylamine hydrogen chloride.

References Cited in the file of this patent

Chemical Abstracts, vol. 47, 1953, col. 10967h.

Systematic Inorganic Chemistry (Yost and Russell), published by Prentice Hall, Inc., New York, 1944, pages 108–9.

Besson et al.: "Sur le chlorazature de phosphore," Comp. Ren. Tome 143, July–December 1906, page 38.

Mellor: "Comprehensive Treatise on Inorganic and Theoretical Chemistry," Longmans, Green and Co., New York, 1928, vol. 8, page 722.